US010005164B2

(12) United States Patent
Stock et al.

(10) Patent No.: US 10,005,164 B2
(45) Date of Patent: Jun. 26, 2018

(54) METHOD FOR OPERATING AT LEAST ONE HAND-HELD POWER TOOL (71) Applicant: Robert Bosch GmbH, Stuttgart (DE)

(72) Inventors: Joern Stock, Wernau (DE); Florian Esenwein, Leinfelden-Echterdingen (DE); Joachim Schadow, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/383,248

(22) Filed: Dec. 19, 2016

(65) Prior Publication Data
US 2017/0173751 A1 Jun. 22, 2017

(30) Foreign Application Priority Data
Dec. 21, 2015 (DE) .................. 10 2015 226 183

(51) Int. Cl.
| G08B 1/08 | (2006.01) |
| G05B 19/02 | (2006.01) |
| G08B 21/00 | (2006.01) |
| B23Q 11/00 | (2006.01) |
| B23Q 17/12 | (2006.01) |
| G08B 21/02 | (2006.01) |
| B25F 5/00 | (2006.01) |
| B23Q 17/09 | (2006.01) |

(52) U.S. Cl.
CPC ...... *B23Q 11/0092* (2013.01); *B23Q 17/0971* (2013.01); *B23Q 17/12* (2013.01); *B25F 5/006* (2013.01); *G08B 21/02* (2013.01)

(58) Field of Classification Search
CPC .... A61B 2562/0219; A61B 5/11; G01H 1/00; G01H 3/14
USPC .................... 340/539.11, 4.36, 680
See application file for complete search history.

(56) References Cited

U.S. PATENT DOCUMENTS

| 2005/0000998 A1* | 1/2005 | Grazioli ............. B25B 27/0085 227/2 |
| 2009/0040061 A1* | 2/2009 | Golunski ................ G07C 3/08 340/683 |
| 2009/0140154 A1* | 6/2009 | Roth ....................... G01H 1/00 250/370.07 |
| 2011/0162858 A1* | 7/2011 | Coste ........................ B25F 5/00 173/1 |
| 2012/0146789 A1* | 6/2012 | De Luca ................ G08B 21/12 340/540 |
| 2012/0318545 A1* | 12/2012 | Schreiber ................. B25F 3/00 173/1 |
| 2015/0000943 A1* | 1/2015 | Diem .................... B25D 16/00 173/11 |

(Continued)

FOREIGN PATENT DOCUMENTS

| DE | 10 2007 014 891 A1 | 10/2008 |
| DE | 10 2007 014 894 A1 | 10/2008 |
| EP | 1 690 648 A2 | 8/2006 |

(Continued)

*Primary Examiner* — Emily C Terrell
(74) *Attorney, Agent, or Firm* — Maginot, Moore & Beck LLP (57) ABSTRACT A method is proposed for operating at least one hand-held power tool, in which a data processing device, realized separately from the hand-held power tool, processes at least one application quantity, in particular a vibration quantity, with respect to a user.

4 Claims, 4 Drawing Sheets (56) References Cited

U.S. PATENT DOCUMENTS

2017/0036315 A1* 2/2017 Wimitzer ................. B25F 5/00

FOREIGN PATENT DOCUMENTS

EP 1 769 887 A1 4/2007
GB 2411472 A * 8/2005 ............... A61B 5/11

* cited by examiner

METHOD FOR OPERATING AT LEAST ONE HAND-HELD POWER TOOL

This application claims priority under 35 U.S.C. § 119 to application no. DE 10 2015 226 183.2, filed on Dec. 21, 2015 in Germany, the disclosure of which is incorporated herein by reference in its entirety.

BACKGROUND

A method for operating at least one hand-held power tool has already been proposed.

SUMMARY

A method is proposed for operating at least one hand-held power tool, in which a data processing device, realized separately from the hand-held power tool, processes at least one application quantity, in particular a vibration quantity, with respect to a user.

This makes it possible to achieve reliable operator protection and/or a high degree of working safety. A method that is particularly well adapted to the user can be achieved. Data relating to application of a hand-held power tool, and/or a burden on the user, can be documented and/or analyzed. Preferably, the data processing device is disposed in a housing that is realized separately from the housing of the hand-held power tool. Preferably, the housing in which the data processing device is disposed is realized so as to be mechanically unconnected to the housing of the hand-held power tool. A "hand-held power tool" in this context is to be understood to mean, in particular, a machine for performing work on workpieces, but advantageously a power drill, a hammer drill and/or percussion hammer, a battery-powered screwdriver, a battery-powered drill, a saw, a plane, a screwdriver, a router, a sander, an angle grinder, a garden appliance and/or a multifunction tool. A "data processing device" is to be understood to mean, in particular, a device having an information input, an information processing system and an information output. Advantageously, the data processing device has at least one processor, a storage memory, input and output means, further electrical components, an operating program, closed-loop control routines, open-loop control routines and/or calculation routines. Preferably, the components of the data processing device are disposed on a common printed circuit board and/or, advantageously, disposed in a common housing. An "application quantity" in this context is to be understood to mean, in particular, a quantity that characterizes the application, for example an operating time, preferably a burden quantity, caused by the hand-held power tool, such as, for example, produced noise, produced dust and/or gas, acceleration, rotary acceleration, reaction force or vibration. Preferably, the data processing device receives, stores, accumulates and/or compares the at least one application quantity. Preferably, the data processing device sets the at least one application quantity in relation to at least one user-specific quantity such as, for example, body mass, body size, age, training level or other quantity considered appropriate by persons skilled in the art. "Provided" is to be understood to mean, in particular, specially programmed, designed and/or equipped. That an object is provided for a particular function is to be understood to mean, in particular, that the object fulfills and/or executes this particular function in at least one application and/or operating state.

It is additionally proposed that, in at least one operating state, a fastening unit fastens the data processing device to the body of the user. This enables the data processing device to be employed in a particularly user-friendly manner. Preferably, the fastening unit has at least one arm-band and/or ankle-band, a belt loop, an adhesive element, a hook-and-loop element and/or other connecting element, considered appropriate by persons skilled in the art, for connecting to the body of the user and/or to an item of clothing. It is conceivable for the fastening unit to comprise elements for basic functions such as display of a time and/or data, a timer function and/or alarm-clock function. Preferably, the fastening unit fastens the data processing device to an extremity of the user. It is conceivable for the fastening unit to fasten the data processing device to an item of clothing of the user.

In an advantageous design, in at least one method step, a wireless interface of the data processing device receives at least one value of the at least one application quantity from the at least one hand-held power tool. This makes it possible to achieve continuous monitoring of the at least one application quantity. A greater degree of user convenience can be achieved. A "wireless interface" in this context is to be understood to mean, in particular, an interface provided to receive and/or emit a signal via an advantageously bodiless information carrier, for example via sound waves, light waves and/or, preferably, radio waves. It is conceivable for a cable-bound interface of the data processing device, additionally or alternatively, to receive at least one value of the at least one application quantity from the at least one hand-held power tool. Preferably, in at least one method step, the wireless interface receives at least one value of the at least one application quantity from at least one further hand-held power tool. Preferably, the wireless interface receives values of the at least one application quantity in a regular manner, in particular periodically. It is conceivable for the receiving to be triggered upon a change of an operating mode, for example upon a switch-on or switch-off. Preferably, the at least one wireless interface is provided for exchanging data with differing hand-held power tools. It is conceivable for the exchange of data to be controlled by open-loop and/or closed-looped control in dependence on a spatial distance. For example, a nearest hand-held power tool is selected for an exchange of data. It is conceivable for the data processing device to be connected, in a coupling step, to the at least one hand-held power tool. It is conceivable for the data processing device, in the coupling step, to check and/or manage an authorization of the user for the at least one hand-held power tool.

In an advantageous design, in at least one method step, the data processing device determines a burden quantity from the at least one application quantity. Operator protection can thus be achieved in a particularly refined manner. A burden on the operator may be limited by measures such as job rotation. The burden quantity may be documented independently of appliances or inclusive of appliances. A basis of data may be made available for compensation payments. A "burden quantity" in this context is to be understood to mean, in particular, a quantity affecting the user, such as, for example, vibration, noise, force, torque, a vibration dose, a noise dose and/or a temperature burden. It is also conceivable for the data processing device to have further functions such as, for example, a payment function and/or an information function relating to application quantities such as charge states, overload states, servicing data, in particular servicing intervals and/or other application quantities considered appropriate by persons skilled in the art.

It is additionally proposed that, in at least one method step, the data processing device compares the burden quantity with at least one reference quantity. This enables a particularly reliable burden quantity to be provided. A particularly flexible method can be provided. A "reference quantity" in this context is to be understood to mean, in particular, a reliable and/or non-critical value range, a boundary value of such a value range and/or a reliable, discrete value. Preferably, the data processing device compares a vibration dose, accumulated since commencement of working, with a maximum admissible daily vibration dose, as a reference quantity. Preferably, the data processing device compares a current rotary acceleration of the hand-held power tool with a maximum rotary acceleration to be expected in undisturbed operation.

It is additionally proposed that, in at least one configuration step, the data processing device defines at least one user-specific processing parameter, in particular a weighting parameter. This enables the method to be adapted to the user in a particularly flexible manner. Preferably, the processing parameter is derived from a characteristic of the user, such as, for example, handedness, body mass, body size, age, training level, or other quantity considered appropriate by persons skilled in the art. It is conceivable for the data processing device, in the configuration step, to receive the at least one processing parameter from a sensor, or to read it out from an internal or external data storage device, or to obtain it by transmission by means of an input unit. Preferably, the configuration step precedes commencement of application.

In an advantageous design, in at least one method step, an output unit outputs a processing result of the data processing device. In this way, a user can be advised, in a particularly convenient manner, concerning a value of a burden quantity, in particular in relation to a reference quantity. Preferably, the output unit comprises at least one visual display unit. It is conceivable for the output unit to comprise further visual output elements, as well as acoustic and/or haptic output elements. Preferably, the output unit is disposed in or on the housing of the fastening unit. It is conceivable for the output unit to be realized as an external output unit, for example as part of a mobile telephone, tablet or laptop. It is conceivable for the data processing device to initiate measures for protection of the user in dependence on a processing result and, for example, to generate a warning signal and transmit it to the output unit, to a safety system and/or to a warning system, and/or to block the hand-held power tool for the user.

It is additionally proposed that, in at least one method step, an acceleration sensor senses a vibration on the body of the user. This makes it possible to obtain a particularly reliable value for the vibration. Preferably, in at least one method step, the acceleration transmits vibration data to the data processing device. Preferably, the acceleration sensor is disposed in and/or on a housing of the fastening unit for fastening the data processing device.

In an advantageous design, in at least one method step the data processing device checks or determines a burden quantity by means of the data sensed by the acceleration sensor. This allows mutual verification of various measurement values. Reliability of the method can be increased further. Incorrect outputs can be avoided. Preferably, the acceleration sensor transmits sensed data to the data processing device. Preferably, the data processing device checks a burden quantity in dependence on an operating mode, by means of the data sensed by the acceleration sensor, or determines a burden quantity.

It is additionally proposed that the data processing device blocks operation of the at least one hand-held power tool in dependence on the at least one application quantity. Danger to the user can thereby be reliably avoided. Preferably, the data processing device blocks an authorization of the user for the hand-held power tool and/or transmits a switch-off signal to the open-loop and/or closed-loop control unit of the hand-held power tool. It is conceivable for the data processing device to provide a warning signal and/or to request the user to acknowledge a warning message. It is conceivable for the data processing device to be provided for emergency switch-off, for example if the data processing device and/or the user are/is at great distance from the at least one hand-held power tool.

Additionally proposed is a data processing device, in particular a data processing device for executing a method according to the disclosure, which is provided to process at least one application quantity, in particular a vibration quantity, with respect to a user, in the case of operation of a hand-held power tool. A data processing device can thereby be provided for particularly efficient monitoring of safe operation of the hand-held power tool. Preferably, the data processing device is provided to consolidate a plurality of application quantities and to process them with respect to the user.

Additionally proposed is a system having this data processing device and having at least one hand-held power tool. This makes possible to provide a system for particularly safe application of the hand-held power tool. Preferably, the system has an input unit, in particular for changing over between operating modes, for example differing display modes. It is conceivable for a display mode of the display unit to change in a regular manner, in particular periodically. Preferably, the system has an energy supply, for example a battery, a rechargeable battery, a fuel cell and/or an energy converter. It is conceivable for the energy supply to comprise an inductive charging unit. It is conceivable for the system to have a plurality of fastening units, which are provided to be fastened to differing extremities.

Additionally proposed is a hand-held power tool, in particular a hand-held power tool for implementing a method according to the disclosure, which has at least one wireless interface provided for transmitting an application quantity, in particular a vibration quantity. This makes it possible to achieve operator protection that can be applied in a particularly convenient manner.

The method, data processing device, system and hand-held power tool according to the disclosure in this case are not intended to be limited to the application and embodiment described above. In particular, the method, data processing device, system and hand-held power tool according to the disclosure may have individual elements, components and units and/or method steps that differ in number from a number stated herein, in order to fulfill a principle of function described herein. Moreover, in the case of the value ranges specified in this disclosure, values lying within the stated limits are also to be deemed as disclosed and applicable in any manner.

BRIEF DESCRIPTION OF THE DRAWINGS

Further advantages are disclosed by the following description of the drawings. The drawings show two exemplary embodiments of the disclosure. The drawing and the description contain numerous features in combination. Persons skilled in the art will also expediently consider the features individually and combine them to create appropriate further combinations.

There are shown in.

DETAILED DESCRIPTION

Figure 1:
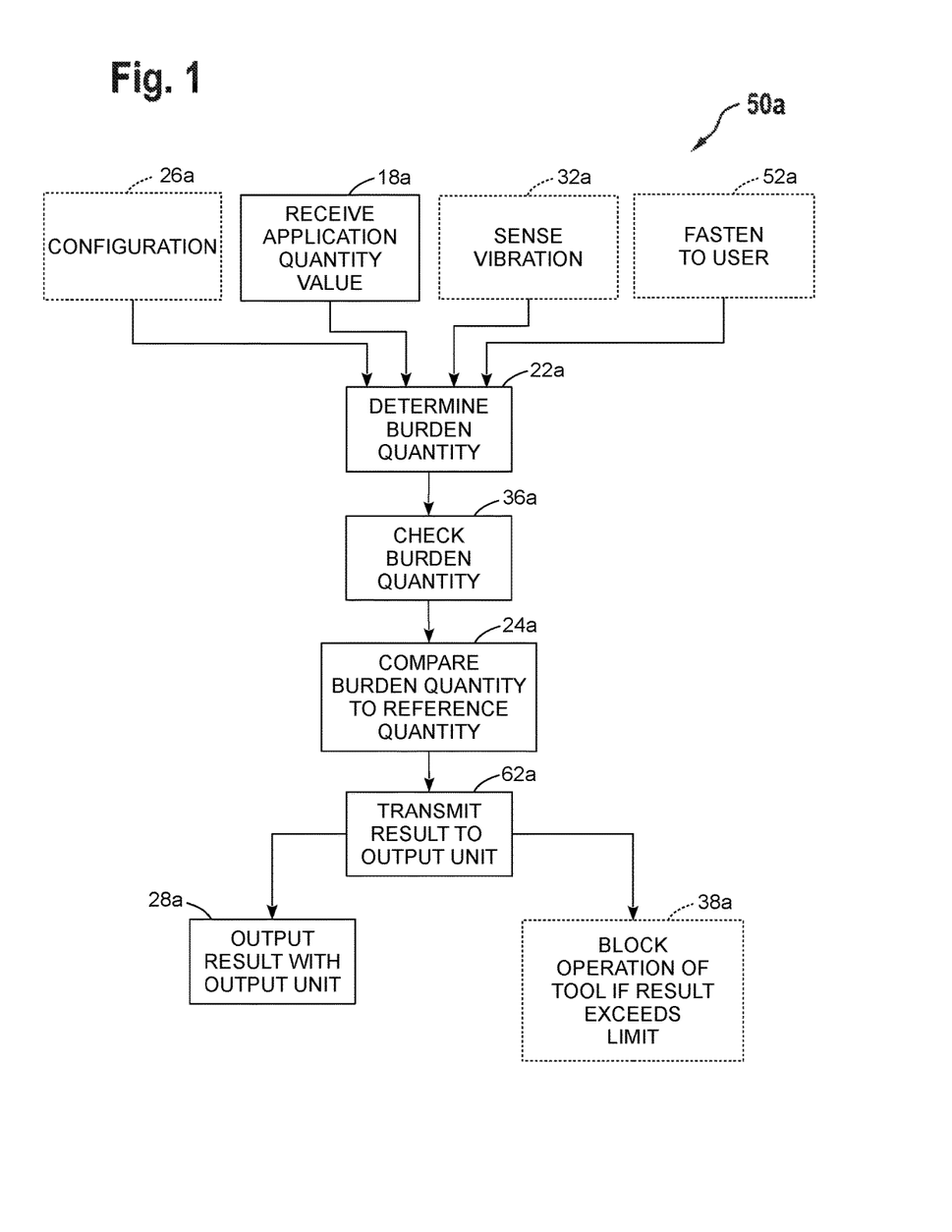
FIG. 1 a flow diagram of the method according to the disclosure.

FIG. 1 shows a flow diagram 50a of a method for operating a hand-held power tool 10a. In the method, a data processing device 14a, realized separately from the hand-held power tool 10a, processes at least one application quantity with respect to a user. In the present exemplary embodiment, the data processing device 14a processes a quantity of vibration to the user. In the present exemplary embodiment, the hand-held power tool 10a is realized as an angle grinder (see FIG. 2).

In at least one operating state, a fastening unit 16a fastens the data processing device 14a to the body of the user. In at least one method step 52a, the data processing device 14a is fastened to an extremity 54a of the user by means of the fastening unit 16a. In the present exemplary embodiment, the fastening unit 16a has an arm-band 56a. Two open ends of the arm-band 56a are joined together in a closing operation. For example, in a closing operation, a closure element 58a joins the two open ends of the arm-band 56a. The ends are joined together in a separable manner. It is also conceivable for the arm-band 56a to be composed of a closed ring of an elastically stretchable material. The arm-band 56a is then slipped on, to be placed over the extremity 54a. When in a closed state, the arm-band 56a encompasses the extremity 54a, for example an arm or a leg, of the user, and the fastening unit 16a holds the data processing device 14a at the extremity 54a. The fastening unit 16a has a housing 42a. The data processing device 14a is disposed in the housing 42a of the fastening unit 16a. The fastening unit 16a is provided to fasten the data processing device 14a to the extremity 54a of the user.

Figure 3:
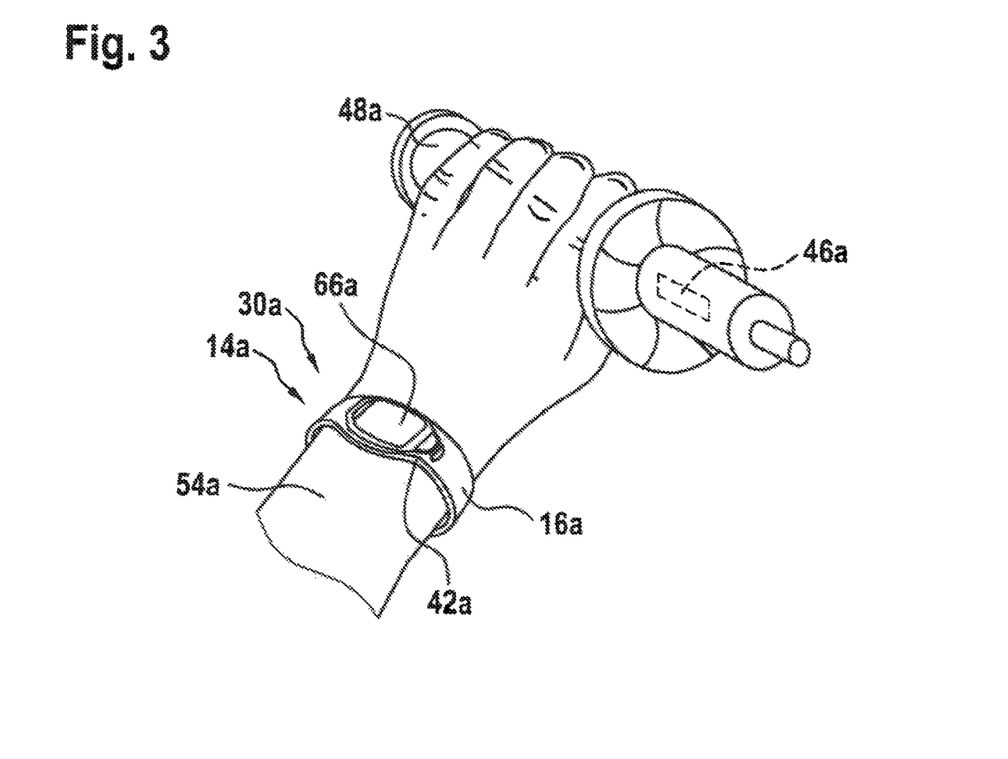
FIG. 3 a data processing device of the device.
Figure 4:
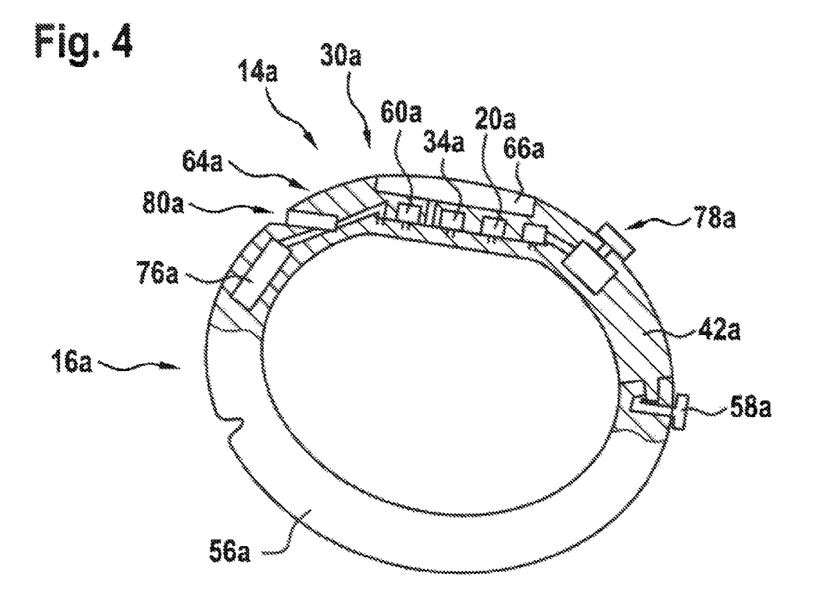
FIG. 4 a schematic sectional view of the data processing device.

In at least one method step 18a, a wireless interface 20a of the data processing device 14a receives at least one value of the at least one application quantity from the at least one hand-held power tool 10a. In the present exemplary embodiment, an acceleration sensor 46a of the hand-held power tool 10a senses the application quantity, realized as a vibration quantity. The acceleration sensor 46a senses the vibration quantity at an ancillary handle 48a of the hand-held power tool 10a (see FIG. 3). The hand-held power tool 10a transmits the application quantity, which is received by the wireless interface 20a of the data processing device 14a. The wireless interface 20a is realized as part of the data processing device 14a (see FIG. 4). The wireless interface 20a receives a value of the vibration quantity from the hand-held power tool 10a, for evaluation by the data processing device 14a. In the present exemplary embodiment, the wireless interface 20a receives a value of the vibration quantity from the hand-held power tool 10a in a regular manner. For example, the wireless interface 20a receives a value of the vibration quantity from the hand-held power tool 10a every ten minutes.

In a scenario in which an insert tool of the hand-held power tool 10a is blocked, the acceleration sensor 46a senses an acceleration due to a counter-torque, which is transmitted to a housing 44a of the hand-held power tool 10a. The acceleration is transmitted, as an application quantity, from the hand-held power tool 10a to the data processing device 14a. The data processing device 14a evaluates the acceleration with respect to the user. The data processing device 14a thereby identifies a blockage of the insert tool, and switches off a drive unit of the hand-held power tool 10a. It is conceivable for the data processing device 14a to compare a sensed value of an acceleration with a threshold value, which is dependent on the physical characteristics of the user. An unforeseen application of force upon the user can be prevented by the data processing device 14a.

In at least one method step 22a, the data processing device 14a determines a burden quantity from the at least one application quantity. In the present exemplary embodiment, the burden quantity is realized as a vibration burden. In the method step 22a, a data processing unit 64a of the data processing device 14a determines a vibration burden on the basis of a vibration dose affecting the user. The data processing unit 64a accumulates values of the at least one application quantity for the purpose of determining the vibration dose. In the present exemplary embodiment, the data processing unit 64a in each case accumulates the values of the at least one application quantity over a period of one day.

In at least one method step 24a, the data processing device 14a compares the burden quantity with a reference quantity. In the present exemplary embodiment, the reference quantity is realized as an admissible daily vibration dose. The reference quantity is stored in a processor and storage unit 60a of the data processing unit 64a. The data processing unit 64a of the data processing device 14a evaluates the burden quantity on the basis of the reference quantity.

In at least one configuration step 26a, the data processing device 14a defines at least one user-specific processing parameter. In the present exemplary embodiment, the data processing device 14a defines a weighting parameter. The data processing device 14a determines the burden quantity as a function of the application quantity and of the processing parameter. The processing parameter is composed of physical characteristics of the user. In the present exemplary embodiment, the processing parameter includes a body mass and a body size of the user.

In at least one method step 62a, the data processing unit 64a transmits a processing result to an output unit 30a. In at least one method step 28a, the output unit 30a outputs a processing result of the data processing device 14a. A display 66a of the output unit 30a displays the processing result for the user. In dependence on the processing result for the user, the data processing device 14a provides information from which the user can infer whether he can continue to work with the hand-held power tool 10a.

In at least one method step 32a, an acceleration sensor 34a senses a vibration on the body of the user. During a work operation, the fastening unit 16a holds the acceleration sensor 34a on the extremity 54a of the user. The vibration sensed by the acceleration sensor 34a is included in the determination of the processing result. The acceleration sensor 34a transmits the sensed vibration to the data processing unit 64a. The data processing unit 64a determines the processing result in dependence on the vibration sensed by the acceleration sensor 34a. It is conceivable for the method step 32a to be omitted.

In at least one method step 36a, the data processing device 14a checks the burden quantity, by means of the vibration sensed by the acceleration sensor 34a. The data processing unit 64a compares the vibration sensed by the acceleration sensor 34a with the application quantity transmitted by the hand-held power tool 10a, and evaluates a reliability of the burden quantity. It is conceivable for the data processing device 14a to determine the burden quantity, for example in an operating mode provided for this, by means of the vibration sensed by the acceleration sensor 34a.

In at least one method step 38a, the data processing device 14a blocks operation of the at least one hand-held power tool 10a in dependence on the at least one application quantity. In a state in which the processing result shows an allowed vibration dose to have been exceeded, the data processing device 14a blocks operation of the at least one hand-held power tool 10a. It is conceivable for the data processing device 14a to block the hand-held power tool 10a for the user and/or to revoke a granted authorization for the user.

Figure 2:
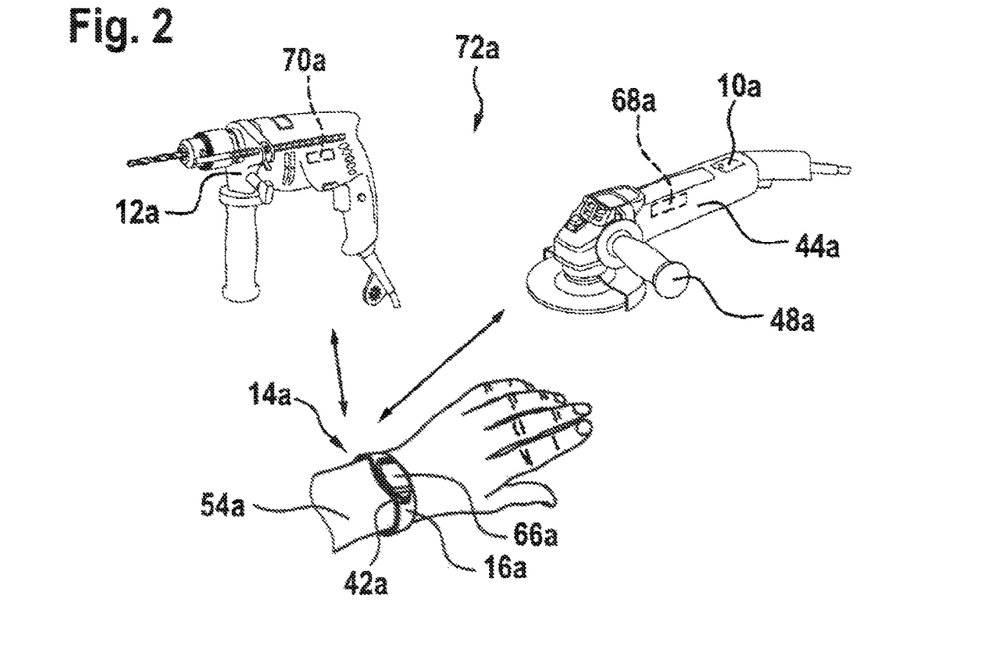
FIG. 2 a system for implementing the method.

FIG. 2 shows a system 72a, comprising the data processing device 14a, the hand-held power tool 10a and a further hand-held power tool 12a. The further hand-held power tool 12a is realized as a hammer drill. In the case of a change of the hand-held power tool used, for example from the hand-held power tool 10a to the further hand-held power tool 12a, the wireless interface 20a of the data processing device 14a receives at least one value of the application quantity from the further hand-held power tool 12a. The data processing device 14a determines the processing result in dependence on the application quantity transmitted by the further hand-held power tool 12a.

The data processing device 14a comprises the data processing unit 64a, the fastening unit 16a and the output unit 30a. The data processing unit 64a comprises the processor and storage unit 60a. The data processing device 14a additionally comprises an energy supply 76a and an input unit 78a, as well as an electrical interface 80a.

The hand-held power tool 10a comprises the ancillary handle 48a and the acceleration sensor 46a. The acceleration sensor 46a is disposed in the ancillary handle 48a of the hand-held power tool 10a. The hand-held power tool 10a and the further hand-held power tool 12a have a respective wireless interface 68a, 70a, provided to transmit the application quantity. The wireless interfaces 68a, 70a are each realized so as to correspond to the wireless interface 20a of the data processing device 14a.

Figure 5:
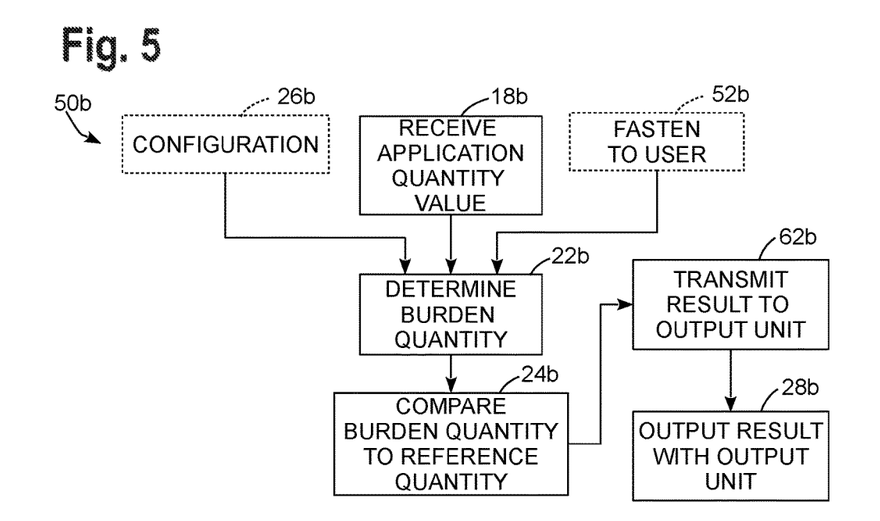
FIG. 5 a flow diagram for a further exemplary embodiment of the method.
Figure 6:
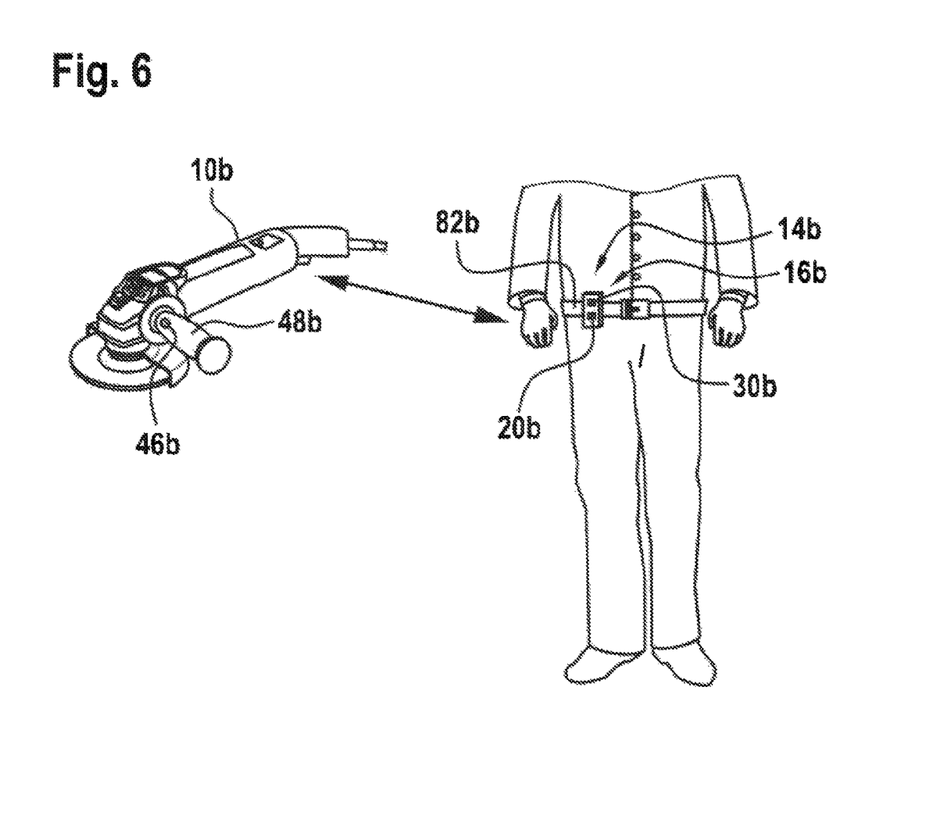
FIG. 6 a hand-held power tool and a data processing device, which are provided for fastening to an item of clothing of a user.

A further exemplary embodiment of the disclosure is shown in FIGS. 5 and 6. The descriptions and the drawings that follow are limited substantially to the differences between the exemplary embodiments, and in principle reference may also be made to the drawings and/or the description of the other exemplary embodiment of FIGS. 1 to 4 in respect of components that have the same designation, in particular in respect of components denoted by the same references. To distinguish the exemplary embodiments, the letter a has been appended to the references of the exemplary embodiment in FIGS. 1 to 4. In the exemplary embodiment of FIGS. 5 and 6, the letter a has been replaced by the letter b.

FIG. 5 shows a flow diagram 50b of a further exemplary embodiment of a method for operation of a hand-held power tool 10b. Like the previous exemplary embodiment, in the method a data processing device 14b that is realized separately from the hand-held power tool 10b processes at least one application quantity with respect to a user. The application quantity is realized as a vibration quantity. In the present exemplary embodiment, the data processing device 14b processes a vibration quantity with respect to the user. In the present exemplary embodiment, the hand-held power tool 10b is realized as an angle grinder (see FIG. 6).

In at least one operating state, a fastening unit 16b fastens the data processing device 14b to the body of the user. Unlike the previous exemplary embodiment, the fastening unit 16b fastens the data processing device 14b to an item of clothing 82b of the user. In the present exemplary embodiment, the fastening unit 16b fastens the data processing device 14b to an item of clothing 82b of the user that is realized as a belt. It is conceivable for the fastening unit 16b to have a belt pouch and/or a belt clip. In at least one method step 52b, the data processing device 14b is fastened to the item of clothing 82b of the user by means of the fastening unit 16b.

In at least one method step 18b, a wireless interface 20b of the data processing device 14b receives at least one value of the at least one application quantity from the at least one hand-held power tool 10b. Like the previous exemplary embodiment, an acceleration sensor 46b of the hand-held power tool 10b senses the application quantity, realized as a vibration quantity. The acceleration sensor 46b senses the vibration quantity at an ancillary handle 48b of the hand-held power tool 10b. The hand-held power tool 10b transmits the application quantity, which is received by the wireless interface 20b of the data processing device 14b. The wireless interface 20b is realized as part of the data processing device 14b. The wireless interface 20b receives a value of the vibration quantity from the hand-held power tool 10b, for evaluation by the data processing device 14b. In the present exemplary embodiment, the wireless interface 20b receives a value of the vibration quantity from the hand-held power tool 10b in a regular manner. For example, the wireless interface 20b receives a value of the vibration quantity from the hand-held power tool 10b every ten minutes.

In at least one method step 22b, the data processing device 14b determines a burden quantity from the at least one application quantity. In the present exemplary embodiment, the burden quantity is realized as a vibration burden. In the method step 22b, a data processing unit of the data processing device 14b determines a vibration burden on the basis of a vibration dose affecting the user. The data processing unit accumulates values of the at least one application quantity for the purpose of determining the vibration dose.

Like the preceding exemplary embodiment, in at least one method step 24b the data processing device 14b compares the burden quantity with a reference quantity. In at least one configuration step 26b, the data processing device 14b defines at least one user-specific processing parameter.

In at least one method step 62b, a data processing unit transmits a processing result to an output unit 30b. In at least one method step 28b, an output unit 30b outputs a processing result of the data processing device 14b. A display of the output unit 30b displays the processing result for the user in a discernible manner. In dependence on the processing result for the user, the data processing device 14b provides information from which the user can infer whether he can continue to work with the hand-held power tool 10b.

What is claimed is:

1. A method of operating at least one hand-held power tool, the method comprising:

sensing, with an acceleration sensor in the at least one hand-held power tool, acceleration data corresponding to a force that the at least one power tool applies to a body of a user during operation of the at least one hand-held power tool;

transmitting, with a wireless interface in the at least one hand-held power tool, the acceleration data to a data processing device worn on a body of the user;

identifying, with the data processing device, a blockage in the at least one hand-held power tool based on the acceleration data; and transmitting, with another wireless interface in the data processing device, a switch-off signal to the at least one hand-held power tool in response to identifying the blockage to prevent operation of the at least one power tool.

2. A system comprising:

at least one hand-held power tool, comprising:
- a motor;
- an acceleration sensor; and
- a first wireless interface configured to transmit acceleration data corresponding to a force that the at least one power tool applies to a body of a user during operation of the motor in the at least one hand-held power tool; and a data processing device configured to be worn by a user of the at least one hand-held power tool comprising:
- a second wireless interface; and
- a processor operatively connected to the second wireless interface, the processor being configured to:
  - receive the acceleration data transmitted from the first wireless interface in the at least one hand-held power tool;
  - identify a blockage in the at least one hand-held power tool based on the acceleration data; and
  - transmit a switch-off signal to the at least one hand-held power tool using the second wireless interface in response to identifying the blockage to prevent operation of the motor in the at least one power tool.

3. The method of claim 1 further comprising:

determining, with the data processing device, the occurrence of the blockage in the at least one hand-held power tool based on an acceleration due to a counter-torque in the acceleration data.

4. The system of claim 2, the processor being further configured to:

determine the occurrence of the blockage in the at least one hand-held power tool based on a counter-torque in the acceleration data.

\* \* \* \* \*